Oct. 21, 1952          G. RICHARD          2,614,639
ROTARY WING DEVICE

Filed Aug. 4, 1947          2 SHEETS—SHEET 1

INVENTOR
GILBERT RICHARD
BY
ATTORNEY

Oct. 21, 1952

G. RICHARD 2,614,639

ROTARY WING DEVICE

Filed Aug. 4, 1947

INVENTOR
GILBERT RICHARD
BY Lucke + Lucke
ATTORNEY

Patented Oct. 21, 1952

2,614,639

UNITED STATES PATENT OFFICE 2,614,639

ROTARY WING DEVICE

Gilbert Richard, Epone, France, assignor to Office National d'Etudes & de Recherches Aeronautiques, Paris, France Application August 4, 1947, Serial No. 765,992
In France May 15, 1944

Section 1, Public Law 690, August 8, 1946
Patent expires May 15, 1964

2 Claims. (Cl. 170—160.25)

The present invention relates to rotary blade systems for use on aircraft and of the kind including a plurality of blades mounted to rotate about an axis parallel to the fore-and-aft direction of the aircraft to provide both lift and propulsion.

The object of my invention is to provide a system of this kind which is better adapted to meet the requirements of practice than those used up to this time.

A preferred embodiment of my invention will be hereinafter described with reference to the accompanying drawings, given chiefly by way of example, and in which.

Figure 1:
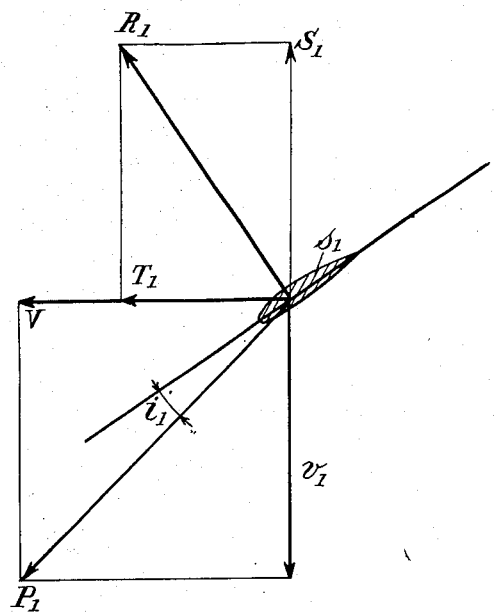
Fig. 1 is an explanatory diagram showing in vertical section by a vertical plane parallel to the fore-and-aft direction of the aircraft, the aerodynamic reactions on one aerofoil cross section of one blade of such a system.

According to this embodiment, an aerodynamic element including a stem 1 and two blades 2—2 rigid therewith in the same manner as in a conventional airscrew has its stem 1 and an annular sliding part 12 rigid therewith longitudinally slidable in a rotary casing 3 forming a slideway for part 12. This casing is journalled about an axis X—X on an axle 15 carried in fixed position by the frame 5 of the aircraft. Casing 3 is driven in rotation about said axis X—X, through a gear wheel 4 rigid with 3.

The annular portion 12 of airscrew element 1—1, 2—2 is freely rotatable about a disc 13 eccentrically pivoted about a fixed axle 14 rigid with axle 15.

The eccentricity of disc 13 (distance from its axis Y—Y to the axis Z—Z of axle 14) is equal to the distance between axis Z—Z and the axis X—X of axle 15 about which casing 3 rotates.

In the embodiment shown by the drawing, casing 3 includes a second guideway at right angles to the first one and in which are guided the elements 1a and 12a of a second aerodynamic element 1a—2a—12a similar to the first one 1—2—12 and at right angles thereto. Annular part 12a is freely rotatable on a disc 13a eccentrically pivoted on axle 14. As the operation of unit 1a—2a—12a—13a is the same as that of unit 1—2—12—13 only the latter will be referred to hereinafter.

With such a construction, when casing 3 rotates about X—X on axle 15, aerodynamic unit 1—2 is given a double movement, to wit:

a.—A rotation, together with casing 3, about axis X—X;

b.—A reciprocating rectilinear translatory movement in casing 3, in synchronism with the movement of rotation thereof with a period of oscillation equal to the period of rotation of said casing 3.

Figure 3:
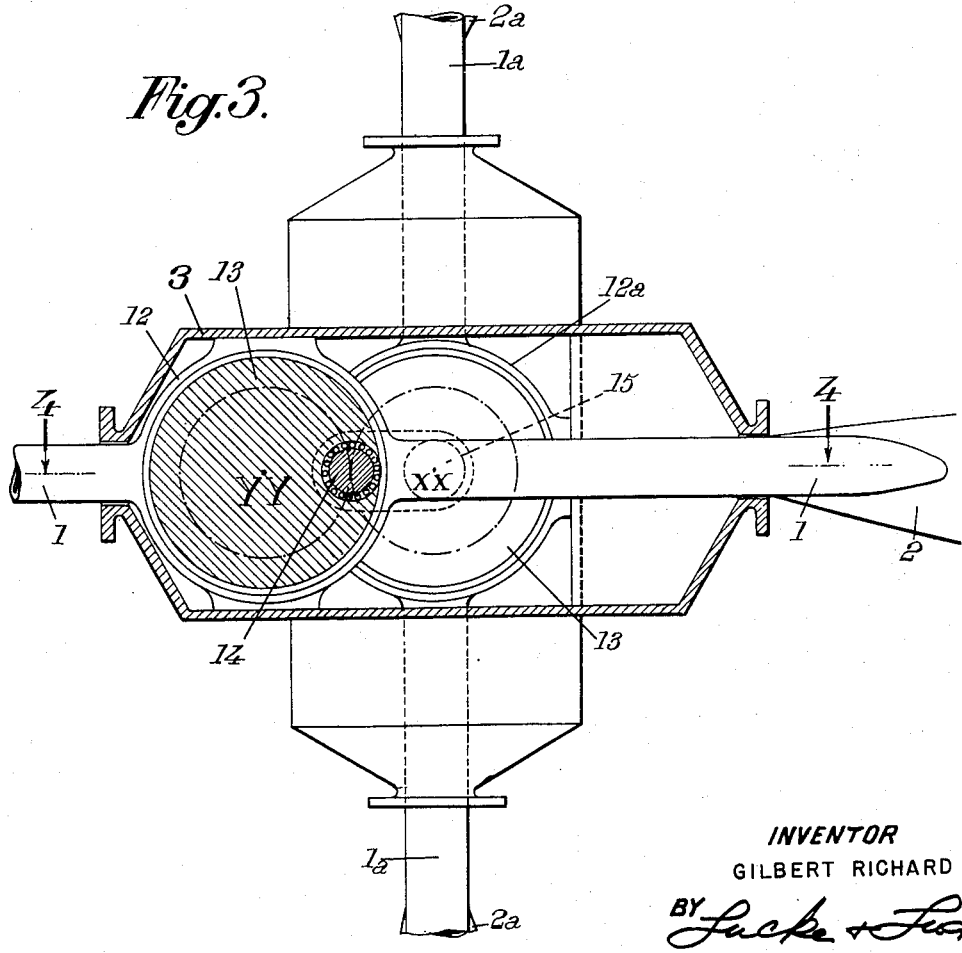
Fig. 3 is a vertical section of an embodiment of a rotary blade system according to my invention.

Consequently, supposing for instance that casing 3 rotates in the anti-clockwise direction, every aerofoil section $s_1$ of the blade 2 on the lefthand side of axis Y—Y is moving at a speed $v_1$ higher than that $v_2$ of the similar but inversely inclined aerofoil section $s_2$ of the other blade 2 located at the same distance from Y—Y on the righthand side thereof, since the angular velocity is the same for all points but the distance from the axis of rotation X—X is always greater on the lefthand side than on the righthand side (see Fig. 3) due to the reciprocating translatory movement of element 1—2 in casing 3.

Fig. 1 shows aerodynamic reactions on the first mentioned aerofoil section. The translatory velocity of the aircraft T (in the fore-and-aft direction of axis X—X) composed with the tangential velocity of section $s_1$ gives a resultant velocity $P_1$ for section $s_1$. The chord of section $s_1$ makes an angle $i_1$ with $P_1$ so that the aerodynamic reaction on this aerofoil section is $R_1$, which can be decomposed into a lift $S_1$ and a propulsive force $T_1$.

Figure 2:
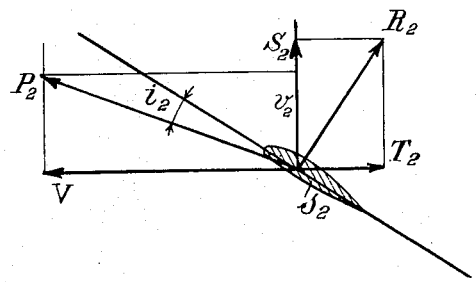
Fig. 2 is a similar diagram relating to the same aerofoil section of the opposed blade.
Figure 4:
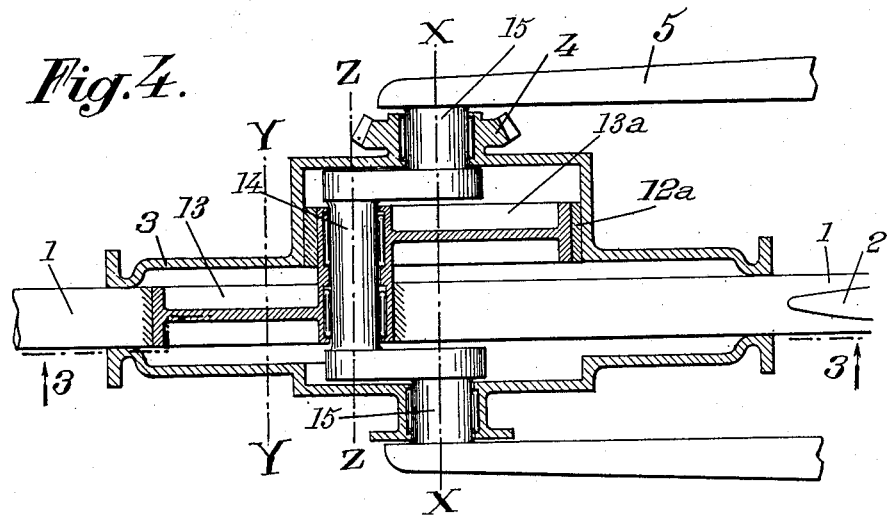
Fig. 4 is a horizontal section of this embodiment.

Fig. 2 is a similar diagram for the aerofoil section $s_2$ of the other blade 2 which is in a plane symmetrical of that of the plane of $s_1$ with respect to a plane passing through Y—Y and perpendicular to stem 1. As above explained, the tangential velocity $v_2$ of this section $s_2$ is of a direction opposed to that of $v_1$ but smaller in magnitude. When composed with the aircraft velocity, the resultant velocity is $P_2$. Now $P_2$ is so disposed with respect to the chord of section $s_2$ that the aerodynamic reaction is $R_2$ which decomposes into a lift $S_2$ and a horizontal force $T_2$ of a direction opposed to that of propulsive force T but smaller than it.

Therefore these two sections have aerodynamic reactions which, when composed together, give a lift $S_1+S_2$ and a propulsive effort $T_1-T_2$. As the same is obviously true for all pairs of corresponding aerofoil cross sections, the aerodynamic unit 1—2 supplies both lift and horizontal propulsion. The same applies to unit 1a—2a.

What I claim is:

1. In combination with an aircraft, a frame carried by said aircraft, a driving rotary casing rotatable on said frame about a horizontal axis of rotation fixed with respect to said frame, a rotor of the airscrew type including a stem extending at right angles to said horizontal axis and two blades carried by the opposed ends of said stem, means carried by said casing for slidably guiding said stem so that the stem axis constantly intersects said horizontal axis of rotation of said casing, and a part pivotally connected to said frame about a horizontal axis fixed with respect to said frame and located in the same horizontal plane as the first mentioned horizontal axis of rotation, to which it is parallel, this part being also pivotally connected to said stem about a horizontal axis parallel to the two above mentioned axes of rotation.

2. In combination with an aircraft, a frame carried by said aircraft, a driving rotary casing rotatable on said frame about a horizontal axis of rotation fixed with respect to said frame, a rotor of the airscrew type including a stem extending at right angles to said horizontal axis and two blades carried by the opposed ends of said stem, means carried by said casing for slidably guiding said stem so that the stem axis constantly intersects said horizontal axis of rotation of said casing, and a part pivotally connected to said frame about a horizontal axis fixed with respect to said frame and located in the same horizontal plane as the first mentioned horizontal axis of rotation, to which it is parallel, this part being also pivotally connected to said stem about a horizontal axis parallel to the two above mentioned axes of rotation, the distance between the first and second mentioned axes being equal to that between the second and third mentioned axes.

GILBERT RICHARD.

REFERENCES CITED

The following references are of record in the file of this patent:

UNITED STATES PATENTS

| Number | Name | Date |
|---|---|---|
| 940,743 | Smith | Nov. 23, 1909 |
| 1,023,501 | Bower | Apr. 16, 1912 |
| 2,039,628 | Brown | May 5, 1936 |
| 2,120,168 | Ash, Jr. | June 7, 1938 |

FOREIGN PATENTS

| Number | Country | Date |
|---|---|---|
| 13,483 of 1913 | Great Britain | June 11, 1914 |